J. F. SEAMAN.
Seed Planter.
No. 22,676.
Patented Jan. 18, 1859.
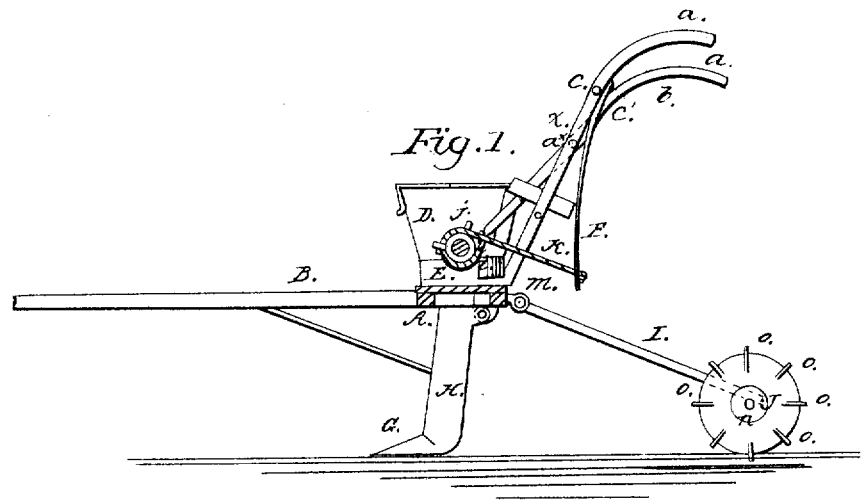
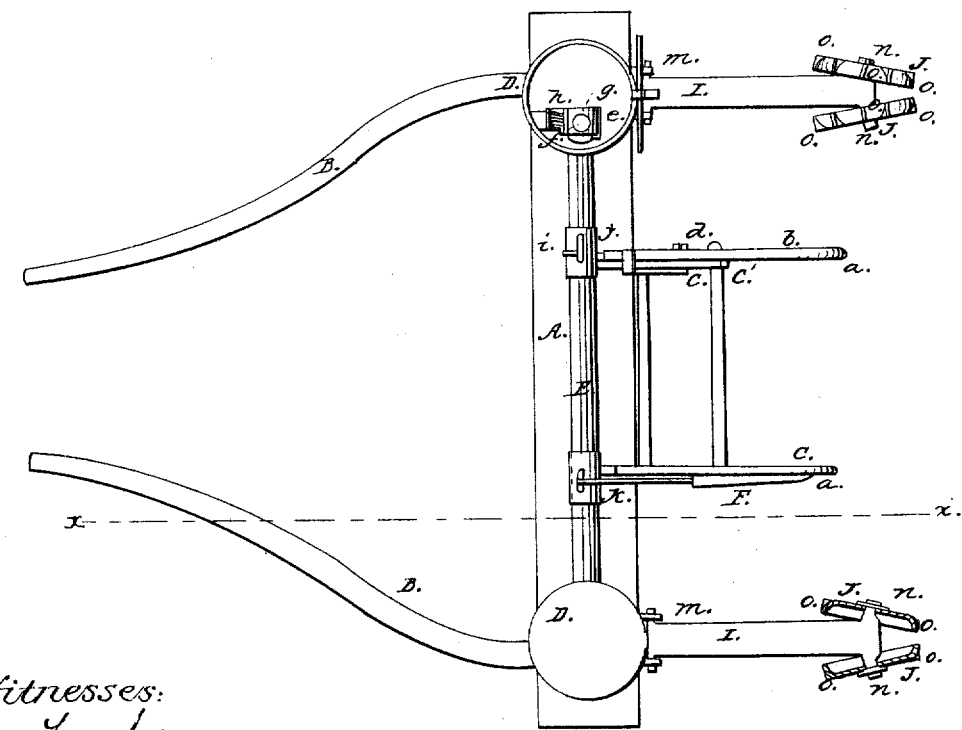
Witnesses:
Inventor:
John F. Seaman

UNITED STATES PATENT OFFICE.

JOHN F. SEAMAN, OF CLYDE, NEW YORK.

IMPROVEMENT IN SEEDING-MACHINES.

Specification forming part of Letters Patent No. 22,676, dated January 18, 1859.

*To all whom it may concern:*

Be it known that I, JOHN F. SEAMAN, of Clyde, in the county of Wayne and State of New York, have invented a new and Improved Seeding-Machine; and I do hereby declare that the following is a full, clear, and exact description of the same, reference being had to the annexed drawings, making a part of this specification, in which—

Figure 1 is a side sectional view of my invention, taken in the line $x\ x$, Fig. 2; Fig. 2, a plan or top view of the same.

Similar letters of reference indicate corresponding parts in the two figures.

This invention relates to an improvement in that class of seeding-machines which are designed for planting seed, chiefly corn, in checkrows or in drills.

The invention consists in a novel means employed for operating manually the seed-distributing device, as hereinafter fully shown and described.

To enable those skilled in the art to fully understand and construct my invention, I will proceed to describe it.

A represents a bar or plate of suitable length, a trifle longer than the space between the rows or hills in which the seed is to be planted. This bar has the thills or shafts B attached to it, one near each end, as shown clearly in Fig. 2.

To the bar A two handles, C C', are attached. These handles extend obliquely upward and back from the bar A, and are curved at their upper ends, as shown clearly at $a$, Fig. 1. The handle C is formed of two parts, $b\ c$, the part $b$ being attached to the part $c$ by a pivot, $d$.

On the bar A there are placed two seed-boxes, D D, one near each end, and E is a shaft, the ends of which have their bearings in the bottoms of the seed-boxes D.

On each end of the shaft E there is a cylindrical head, $e$. These heads are within the seed-boxes D D, and each head has a recess, $f$, made in it, the bottom of which is formed by the head $g$ of a screw. These screws extend into the heads $e\ e$, and by turning them the capacity of the recesses $f$ may be increased or diminished, as desired. Within each seed-box a cut-off brush, $h$, is placed.

The lower end of the part $b$ of the handle C' is attached by a cord or chain, $i$, to an eye, $j$, on the shaft E, the cord or chain $i$ passing around underneath the shaft.

To the handle C of the device a spring, F, is attached, and the lower end of this spring is connected by a cord or chain, $k$, with the shaft E in a direct manner, and not by passing underneath it, as the chain $i$. The spring F, when not acted upon by any extraneous force or power, will keep the shaft E in such a position as to keep the recesses $f$ upward or exposed within the boxes, so that they will be filled with seed. (See Fig. 2.)

To the under side of the bar A two furrow-shares, G G, are attached, one near each end. These furrow-shares are of the usual form, and are attached to the lower ends of bars H H, which are grooved at their back sides to form seed-channels. The upper ends of the bars H are directly below the cylindrical heads $e\ e$ of the shaft E.

To the back edge of the bar A two bars or rods, I I, are attached by joints $m\ m$. These bars or rods are directly in line with the furrow-shares G G, and they are, by means of the joints, allowed to swing freely up and down.

To the outer end of each bar or rod I two dish-shaped wheels, J J, are attached, one at each side. These wheels are fitted on arms $n\ n$ on the bars or rods, which arms or rods have an oblique position relatively with each other, and consequently the same position is given the wheels J J. This position is clearly shown in Fig. 2; and it will be seen that the narrow space is behind, or that the wheels are nearest together at their back parts. The concave sides of the wheels face each other—that is to say, the concave sides of each pair—and each wheel is provided with a series of projections, $o$, at its periphery.

The operation is as follows: The field or ground where corn is to be planted is previously furrowed in one direction, and the machine is drawn along transversely with said furrows. As the shares G G intersect the furrows the operator depresses the upper end of the part $b$ of the handle C, and this movement of said part $b$ actuates the shaft E, and causes the recesses or seed-cells $f$ that are filled with seed to pass below the brushes $h$, the seed dropping into the furrows made by the shares G G. The spring F brings the shaft E back to its original position as the part *b* of the handle is relieved of the pressure of the hand of the operator. The dish-shaped wheels J J cover the seed, said wheels rotating and, in consequence of their oblique position, gathering the earth at each side of the furrows and throwing it into the furrows, the earth being lifted to some extent as it is thrown into the furrows. This is an important feature of the invention, for the wheels cannot become clogged and rendered inoperative, like the usual oblique stationary covering-shares. This is a contingency which frequently occurs with the stationary shares, as clods, stones, and other substances are liable to become wedged in the narrow space between the back ends of the shares. By my invention this cannot occur, as the obstruction would be raised in consequence of the dish shape of the wheels and thrown into the furrow. The projections *o* insure the rotation of the wheels, and the wheels are allowed to rise and fall to conform to the undulating surface of the ground, in consequence of the joints *m*, which connect the bars I to the bar A. By operating the shaft E by means of the part *b* of the handle C' the operator or attendant is allowed to perform the desired work with facility, as the depressing of the outer end of *b* may be done by a simple and natural movement of the hand, without losing any control over the machine.

I do not claim the distributing device formed of seed-cells *f*, made in a cylindrical head, *c*, in connection with cut-off brushes *h*, for this is an old and well-known device. Neither do I claim broadly rotating covering-shares irrespective of the construction and arrangement herein shown; but,

Having thus described my invention, what I do claim as new, and desire to secure by Letters Patent, is—

Operating the seed-distributing device by means of the part *b* of the handle C', attached by a pivot, *d*, to the other part, *c*, of said handle, and connected at its lower end to the shaft E by a cord or chain, *i*, the above parts being used in connection with the spring F, attached directly to the other handle, C, of the implement and to the shaft E by a cord or chain *k*, the whole being arranged substantially as and for the purpose set forth.

JOHN F. SEAMAN.

Witnesses:
  WM. TUSCHL,
  W. HAUFF.